Patented June 19, 1951

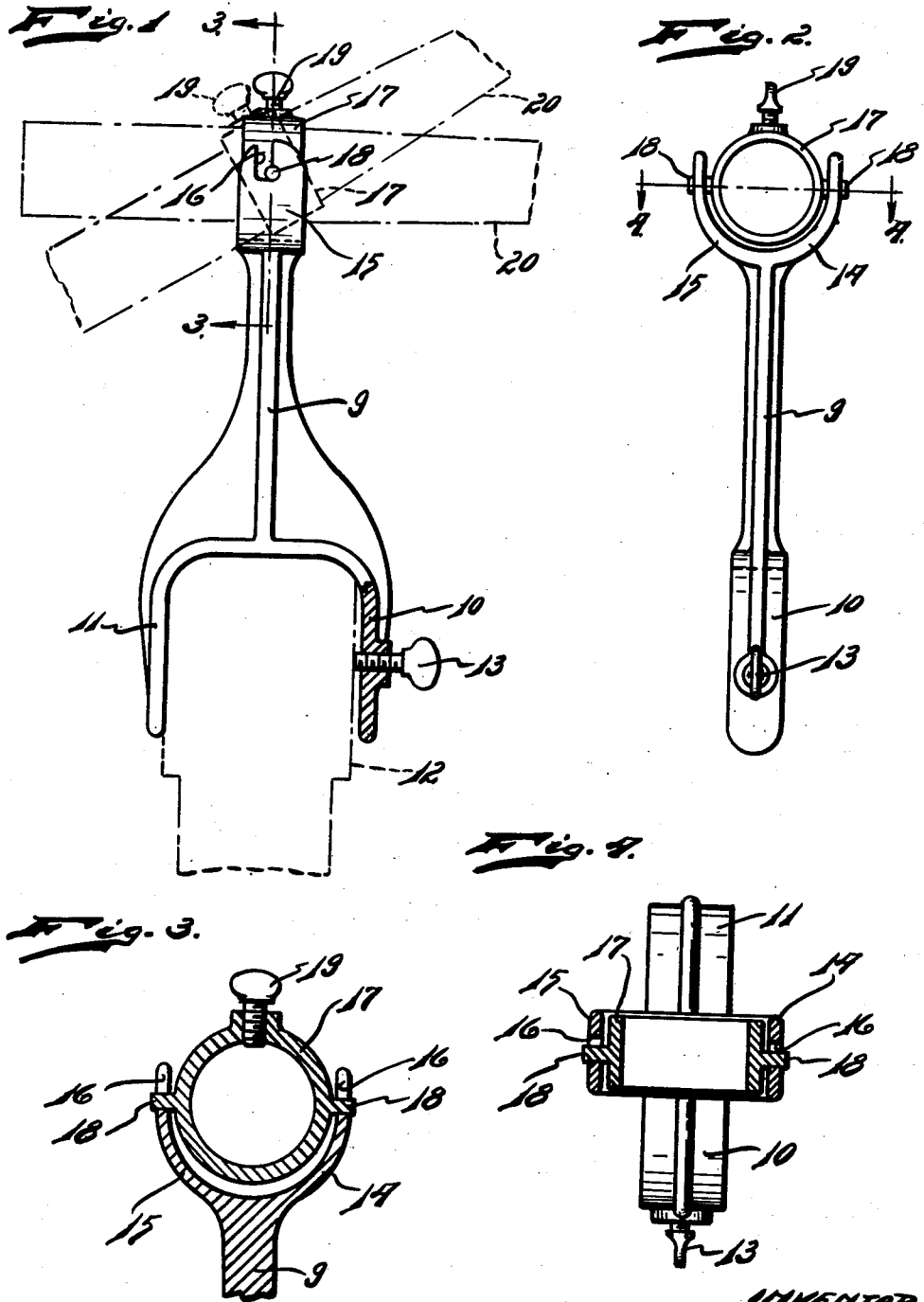

2,557,728

UNITED STATES PATENT OFFICE 2,557,728

FISHING POLE SUPPORT

Martin C. Drumb, Detroit, Mich.

Application May 20, 1946, Serial No. 671,017

2 Claims. (Cl. 248—42)

My invention relates to a new and useful improvement in a fishing pole support. The invention is adapted for mounting on a suitable stationary support and particularly adapted for mounting on a row boat or the like.

It is an object of the present invention to provide a fishing pole support of this class which will be simple in structure, economical to manufacture, durable, compact, light and highly efficient in use.

Another object of the invention is the provision of a fishing pole support so arranged and constructed that the fishing pole when mounted thereon in proper balance will remain in the position in which it is located regardless of the movement of the support on which the pole supporting device is mounted.

Another object of the invention is the provision of a fishing pole support so arranged and constructed that the pole may be easily and quickly positioned thereon or removed therefrom.

Another object of the invention is the provision of a fishing pole support so arranged and constructed that the pole, when desired, may be rocked on a horizontal axis.

Other objects will appear hereinafter.

It is recognized that various modifications and changes may be made in the detail of structure illustrated without departing from the invention itself and it is intended that such variations and changes shall be embraced within the scope of the claims which form a part hereof.

Forming a part of this specification are drawings in which,

Fig. 1 is an elevational view of the invention,

Fig. 2 is an elevational view of the invention taken at right angles to that shown in Fig. 1, Fig. 3 is a fragmentary sectional view taken on line 3—3 of Fig. 1, Fig. 4 is a sectional view taken on line 4—4 of Fig. 2.

In the drawings I have illustrated the invention mounted on a support 12 and embodying the yoke arms 10 and 11 through one of which is threaded the set screw 13 which is adapted to engage the support 12. These yoke arms are connected by the stem 9 to the yoke arms 14 and 15 each of which has formed in its end a bayonet slot 16 projecting inwardly from the end thereof. A ring 17 preferably formed from metal is provided with a pair of outwardly projecting trunnions 18 and diametrically opposite each other. Threaded through the ring 17 is a set screw 19 which may be threaded inwardly to engage the fishing pole 20 which is projected through the ring 17.

The holding portion of the device may be said to embody an elongated body 9, the yoke arms 10 and 11 and 14 and 15 at opposite ends thereof.

In use, the ring 17 would be slipped onto the fishing pole 20 and moved to the proper location and the set screw 19 then tightened to retain the ring in fixed relation to the pole 20. The operator will determine the location of the ring 17 on the pole 20 so that the pole 20 will, by gravity, assume the position desired. For instance, if the user desires the pole 20 to be held at a horizontal position as shown in Fig. 1, the ring 17 would be moved onto the pole until it was perfectly balanced to lie in a horizontal position. If the operator desired it to rest at an angle such as shown in one of the views in Fig. 1, the ring would be moved forwardly to provide a greater weight at the butt of the pole and if the user desired the pole inclined in the opposite direction, the ring would be moved rearwardly. When the ring is attached to the pole, the pole may be easily and quickly mounted to be supported by the arms 14 and 15 by engaging the trunnions 18 in the bayonet shaped slot 16. When so mounted the pole will remain at the position at which it is located. This is particularly important should the supporting member 12 be the side of a boat which is rocking in response to the movement of the water. Under such conditions the pole itself would remain in the position in which it was set as the yoke arms 14 and 15 would rock around the trunnions 18. This avoids any disturbance of the bait which is on the line so that when the pole is once positioned and set it remains in that position regardless of the movement of the boat or other supporting body 12. The result is that a condition is met which many fishermen desire and the device has proven most practicable for the purposes intended.

What I claim as new is:

1. A fishing pole support of the class described comprising: An elongated supporting body; a pair of spaced apart yoke arms at each end of said body, one pair of said yoke arms being adapted for attachment to a suitable support and each of the other pair of arms having a slot extended inwardly from the ends thereof; a ring adapted for a slip fit over and attachment to a fishing pole; and trunnions projecting outwardly from opposite sides of said ring and engageable in said slots for pivotally mounting said ring on said slot bearing arms for free swinging movement on the axes of said trunnions.

2. A fishing pole support of the class described comprising: An elongated body; a pair of spaced apart yoke arms at each end of said body, one pair of arms being adapted for attachment to a suitable support and the other pair of arms each having an inwardly directed slot proceeding inwardly from the end thereof; a ring adapted for embracing a fishing pole in a slip fit; means for securing said ring in fixed relation on said pole; and trunnions projecting outwardly from said ring at opposite sides thereof in diametrical alignment and engageable in said slots for rockably mounting said pole on said slot bearing arms for free swinging movement thereon.

MARTIN C. DRUMB.

REFERENCES CITED

The following references are of record in the file of this patent:

UNITED STATES PATENTS

| Number | Name | Date |
| --- | --- | --- |
| 270,183 | Dunnet | Jan. 2, 1883 |
| 271,021 | Beaudreau | Jan. 23, 1883 |
| 465,778 | Gatchell | Dec. 22, 1891 |
| 1,288,794 | Anderson | Dec. 24, 1918 |
| 1,963,463 | Hammer | June 19, 1934 |
| 2,092,426 | Riddell | Sept. 7, 1937 |
| 2,314,747 | White | Mar. 23, 1943 |